United States Patent
Kolze (10) Patent No.: US 7,409,228 B2
(45) Date of Patent: *Aug. 5, 2008

(54) VOFDM RECEIVER CORRELATION MATRIX PROCESSING USING FACTORIZATION

(75) Inventor: Thomas J. Kolze, Phoenix, AZ (US)

(73) Assignee: Broadcom Corporation, Irvine, CA (US)

(*) Notice: Subject to any disclaimer, the term of this patent is extended or adjusted under 35 U.S.C. 154(b) by 414 days.

This patent is subject to a terminal disclaimer.

(21) Appl. No.: 11/209,937

(22) Filed: Aug. 23, 2005

(65) Prior Publication Data

US 2006/0008018 A1 Jan. 12, 2006

Related U.S. Application Data

(63) Continuation of application No. 10/114,023, filed on Mar. 30, 2002, now Pat. No. 6,947,715.

(51) Int. Cl.
H04B 1/08 (2006.01)
H04M 1/00 (2006.01)

(52) U.S. Cl. ............... 455/562.1; 455/272; 455/132

(58) Field of Classification Search ............ 455/132, 455/272, 504, 222, 226.3, 277.2, 278.1, 130, 455/561, 562.1, 65; 375/144, 147, 149
See application file for complete search history.

(56) References Cited

U.S. PATENT DOCUMENTS

| | | | |
|---|---|---|---|
| 6,564,037 B1 * | 5/2003 | Sweatman et al. | 455/63.1 |
| 6,934,563 B2 * | 8/2005 | Raghothaman et al. | 455/562.1 |
| 7,054,664 B2 * | 5/2006 | Nagaraj | 455/562.1 |
| 7,082,174 B1 * | 7/2006 | Smee et al. | 375/349 |
| 7,084,812 B2 * | 8/2006 | Xin | 342/417 |
| 7,162,210 B2 * | 1/2007 | Garmonov et al. | 455/101 |
| 7,221,698 B2 * | 5/2007 | Kimata | 375/147 |
| 7,333,835 B2 * | 2/2008 | Nagaraj | 455/562.1 |

* cited by examiner

Primary Examiner—Sonny Trinh
(74) Attorney, Agent, or Firm—Garlick, Harrison & Markison; Shayne X. Short (57) ABSTRACT

Vector orthogonal frequency division multiplexing (VOFDM) receiver correlation matrix processing using factorization. Efficient correlation matrix processing is used to combine multiple signals into a single combined signal. This single combined signal may be viewed as being a beam form soft decision. An efficient square root factorization system and method provides for computational resource savings while, at the same time, providing for greater precision of the overall computational results. By reducing intermediate variable calculation dynamic ranges, the overall calculation becomes more precise. Particularly within fixed-point arithmetic applications, a reduction in dynamic range of the intermediate variable calculations provides for a significant increase in final calculation precision. Square root factorization and subsequent mathematical operations produce some savings in the number of computational steps required in dual antenna embodiments, yet the savings in terms of computational steps and required processing resources are relatively much larger within embodiments having even larger number of antennae.

20 Claims, 8 Drawing Sheets

VOFDM RECEIVER CORRELATION MATRIX PROCESSING USING FACTORIZATION

CROSS REFERENCE TO RELATED PATENTS/PATENT APPLICATIONS

The present U.S. Utility Patent Application claims priority pursuant to 35 U.S.C. § 120, as a continuation, to the following U.S. Utility Patent Application which is hereby incorporated herein by reference in its entirety and made part of the present U.S. Utility Patent Application for all purposes:

1. U.S. Utility application Ser. No. 10/114,023, entitled "VOFDM receiver correlation matrix processing using factorization," filed Mar. 30, 2002 now U.S. Pat. No. 6,947,715.

INCORPORATION BY REFERENCE

The following U.S. Utility Patent Applications are hereby incorporated herein by reference in their entirety and made part of the present U.S. Utility Patent Application for all purposes:

1. U.S. Utility patent application Ser. No.10/109,978, entitled "Optimal decision metric approximation in bit-soft decisions," filed Saturday, Mar. 30, 2002, pending.

2. U.S. Utility patent application Ser. No. 10/112,128, entitled "Frequency drift and phase error compensation in a VOFDM receiver," filed Saturday, Mar. 30, 2002, pending.

3. U.S. Utility patent application Ser. No. 10/112,009, entitled "Modified branch metrics for processing soft decisions to account for phase noise impact on cluster variance," filed Saturday, Mar. 30, 2002, pending.

4. U.S. Utility patent application Ser. No. 10/112,567, entitled "Characterizing channel response in a single upstream burst using redundant information from training tones," filed Saturday, Mar. 30, 2002, pending.

BACKGROUND OF THE INVENTION

1. Technical Field of the Invention

The invention relates generally to communication systems; and, more particularly, it relates to signal processing within a communication system's receiver that receives multiple signals.

2. Description of Related Art

It is known that many communication systems transmit digital data through imperfect communication channels. These symbols may undergo some undesirable corruption due to the imperfection of the communication channel. One effort to try to avoid such situations is focused on performing forward error correction (FEC) coding. However, there is typically some difficulty in extracting the information contained within these symbols after they have been undesirably altered within the communication channel. There exist some methods that seek to curb the effect that the communication channel has had on the data; one such method includes employing using Decision Feedback Equalizers (DFEs). However, even after the incoming signal has been equalized, the extraction of the data, that has undergone some alteration due to the channel effects, is still a probabilistic determination. Many communication systems seek to estimate the actual channel response of a communication channel. Of the many deficiencies that may be introduced in doing this, one major problem is the undesirable introduction of noise into both the estimate of the channel response as well as the estimate of the channel noise within the communication system.

The VOFDM standard defines the physical layer and additional layers in which a plurality, e.g., up to 1,024 separate carriers (tones) carry either data (data tones) or pilot signals (pilot tones). The 1,024 tones are separated in frequency such that they are orthogonal to one another. One current implementation of a wireless communication system employs vector orthogonal frequency division multiplexing (VOFDM); the VOFDM standard also defines a receiver implementation having two antennae. These two antennae each operate on their own respective receive path, and those different receive paths are then combined into a single signal for subsequent signal processing. The signals received via each of the two antennae are combined using a combining methodology to perform beam forming. The beam forming involves taking these two signals and perform channel combining, combining of these two different receive paths. The calculations that are required to perform this channel combining are typically very computationally intensive in the prior art approaches.

More specifically, correlation matrixes are required for combining the input data for the two antennae according to the VOFDM specification. These correlation matrices are 2×2 for the typical 2-antenna case. The operations provided for in the VOFDM standard require significant matrix operations to combine the data from the multiple antennas using the correlation matrices. To perform these complex operations, a significant amount of computational processing resources must be employed in the prior art approaches. Such significant matrix operations require a large number of mathematical operations. In prior art approaches, these significant processing resources must simply be dedicated and provisioned. These computational intensive equations must necessarily be carried out with significant precision in general, to avoid numerical instability and quantization noise impacting the results. The provisioning of these intensive computational resources inherently draws away from other resources within the receiver system.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

The present invention is operable, in various embodiments, to perform combination of multiple signals that together represent a composite signal. The present invention is operable to combine those multiple signals into a single signal that may be used for any necessary and subsequent signal processing. The present invention is able to provide a computationally efficient and improved system and method to perform the combination of these signals, using correlation matrices, in a way that is much more efficient than the way used in prior art approaches.

In one embodiment, the present invention relates to the vector orthogonal frequency division multiplexing (VOFDM) portion of the broadband wireless internet forum (BWIF) standard set. The VOFDM standard defines the physical layer and additional layers in which a plurality, e.g., up to 1,024 separate carriers (tones) carry either data (data tones) or pilot signals (pilot tones). The 1,024 tones are separated in frequency such that they are orthogonal to one another. The VOFDM standard also defines a multiple antenna receive path that combines the signal received via each of the antennas using an optimal combining methodology.

In addition, the present invention is operable within communication systems employing a variety of modulation coding schemes including QPSK, 16 QAM, 64 QAM, 256 QAM, and 1024 QAM.

Correlation matrixes are required for combining the input data from multiple antennae according to the VOFDM specification; the typical embodiment employs two antennae. It is noted that the present invention is extendible to embodiments that include more that 2 antennae; it may be adapted to even higher numbers of antennae including a 3 antenna case, a 4 antenna case, and so on. For example, the present invention is adaptable to perform improved processing of the correlation matrices for these cases; for example, these correlation matrices are 2×2 for a 2-antenna case, 3×3 for a 3-antenna case, and 4×4 for a 4-antenna case; they are scalable in general. The operations provided for in the VOFDM standard require significant matrix operations to combine the data from the multiple antennae using the correlation matrices, yet the present invention provides for much improved computational processing functionality. The prior art approach involves employing significant matrix operations require a large number of mathematical operations, and the present invention provides a solution that is much more computationally efficient. The present invention provides for a solution where the requisite equations, employed to combine the multiple signals, may be carried out more efficiently while maintaining an even higher degree of precision and also avoiding numerical instability and minimizing quantization noise that may undesirably impact the final results.

In one embodiment, the present invention employs correlation matrices that may be factorized using a square root factorization methodology to produce factorized matrices. These factorized matrices may be more easily applied in correlating multiple data paths. For the 2×2 example, such square root factorization and subsequent mathematical operations produce relatively smaller savings in the number of computational steps required. However, for the 3×3 and 4×4 correlation matrix operations, the savings in terms of computational steps and required processing resources are relatively much larger. Further, the dynamic range of the numeric values is significantly reduced by the factorization, even in the 2×2 case for the dual antenna embodiment. This reduced dynamic range allows for fewer bits of precision in executing the operations. Particularly by reducing the precision of intermediate variables, the overall precision of the calculations is significantly improved. Moreover, the present invention may be implemented with even fewer computational resources that the prior art approach. The present invention provides for an overall improved computational precision even when using even reduced computational processing resources. This is a win-win situation in terms of reducing processing provisioning and also improving precision.

Figure 1:
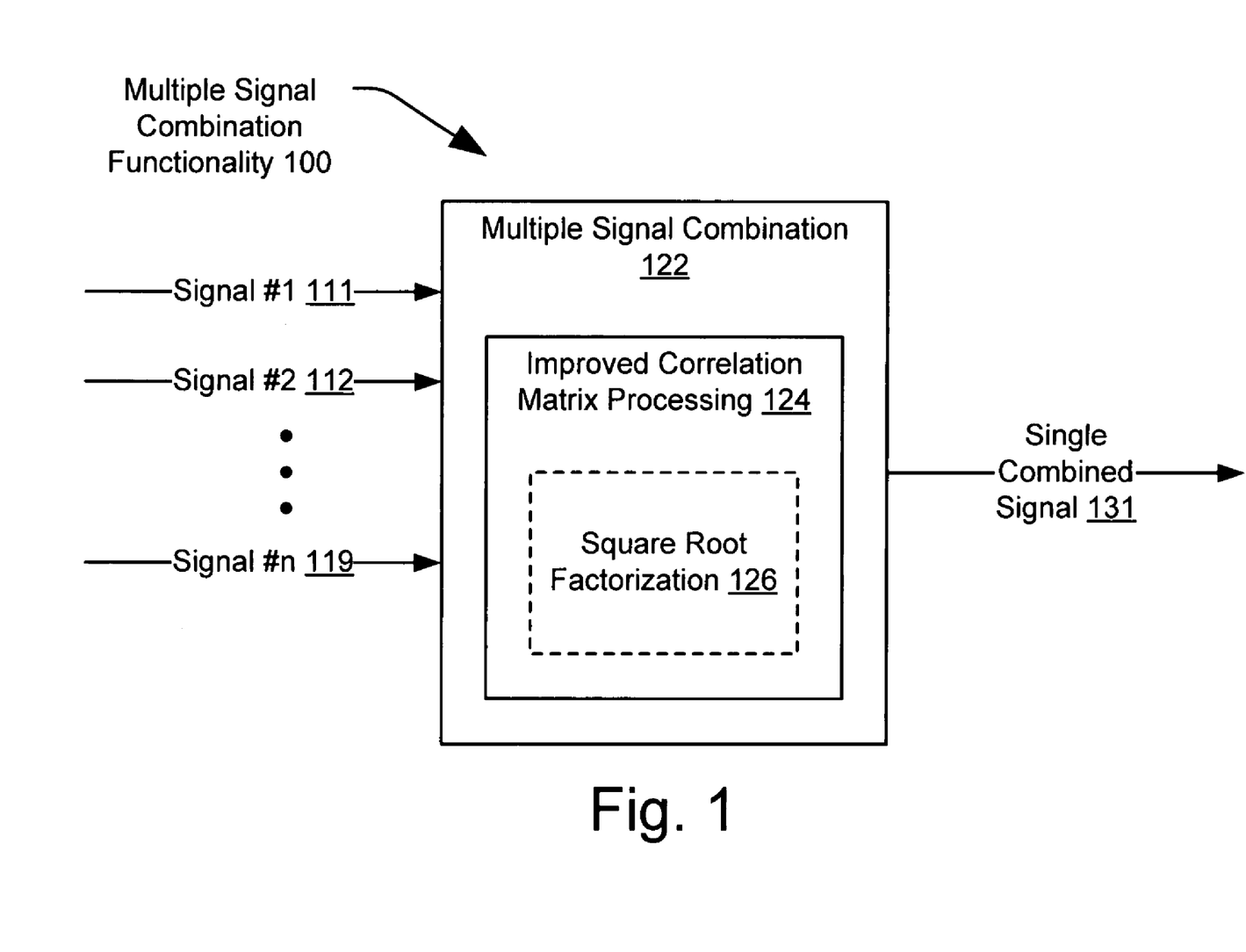
FIG. 1 is a functional block diagram illustrating an embodiment of multiple signal combination functionality that operates in accordance with certain aspects of the present invention.

FIG. 1 is a functional block diagram illustrating an embodiment of multiple signal combination functionality 100 that operates in accordance with certain aspects of the present invention. An indefinite number of signals, shown as a signal #1 111, a signal #2 112, . . . , and a signal #n 119, as provided to a functional block 112 that performs multiple signal combination. The functional block 112 performs improved correlation matrix processing, as shown in the functional block 124, to combine the multiple signals 111-119 into a single combined signal 131. Various embodiments of the present invention employ square root factorization, as shown in the functional block 126, to provide for more efficient correlation matrix processing to be used to combine the multiple signals 111-119. The functionality offered by the various embodiments of the present invention are adaptable within wireless communication systems and wireline communication systems; wireline communication systems include those employing any number of various communication media including copper wire, fiber-optic cabling, and other communication media known in the art of communication systems.

Figure 2:
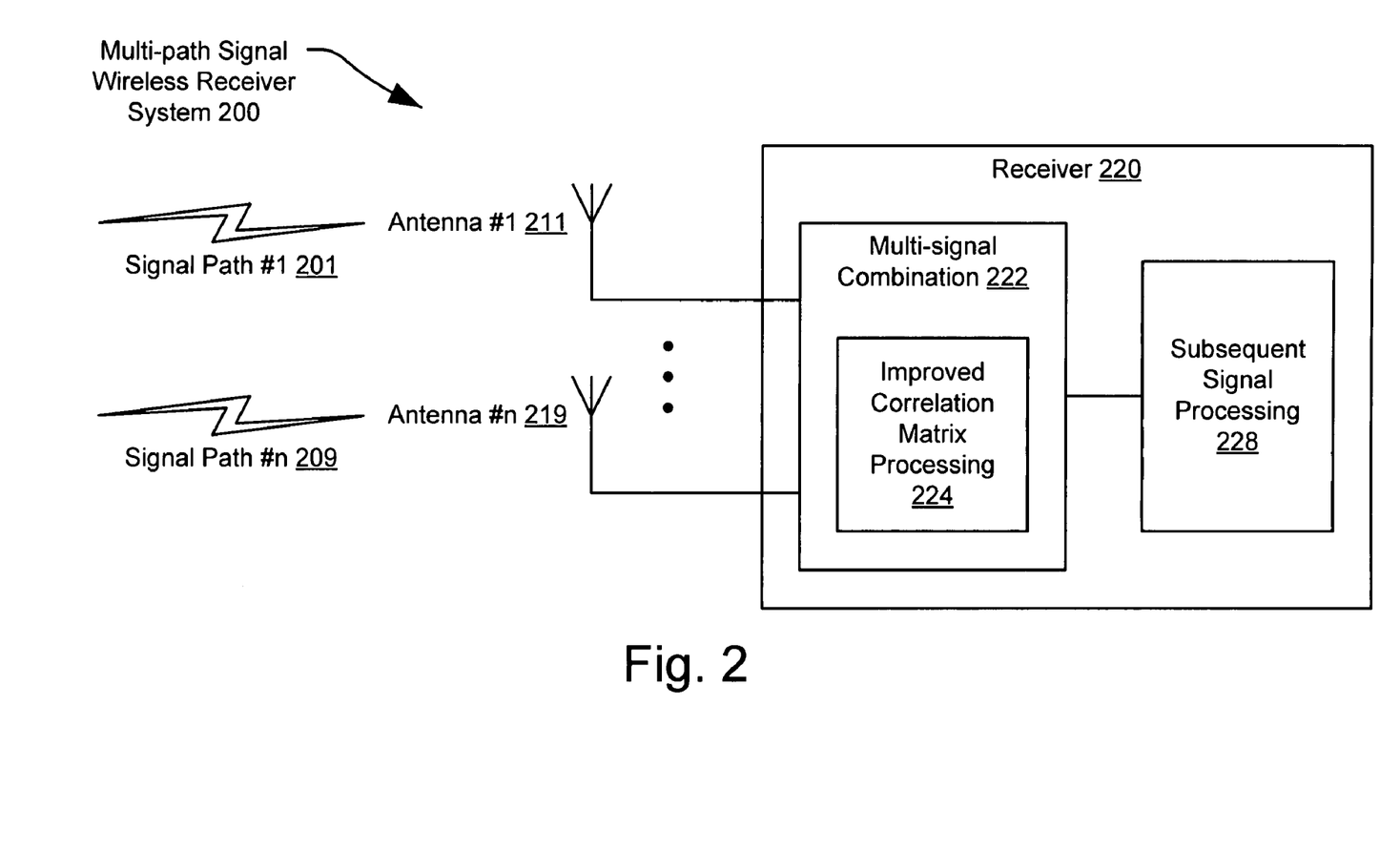
FIG. 2 is a system diagram illustrating an embodiment of a multi-path signal wireless receiver system that is built in accordance with certain aspects of the present invention.

FIG. 2 is a system diagram illustrating an embodiment of a multi-path signal wireless receiver system 200 that is built in accordance with certain aspects of the present invention. Two or more signal paths are received using an antenna array. The multiple signal paths are shown as a signal path #1 201, . . . , and a signal path #n 209. The antenna array is shown as an antenna #1 211, . . . , and an antenna #n 219. The multiple signal paths 201-209 may be provided by multiple antennae at a transmitter, or they may be provided by the multiple paths that may be traversed from a single antenna at a transmitter. The multiple paths may be generated by the various paths that the wireless communication may tae when traveling from a transmitter to a receiver within a communication system. For example, one path may be direct line of sight; other paths may bounce off of various elements including buildings, trees, and/or mountains. Those persons having skill in the art will appreciate and understand the various signal paths that may be generated within a single communication system. While the vector orthogonal frequency division multiplexing (VOFDM) systems and methods, in that they provide even greater effectiveness and improved signal processing compared to single antenna receiver systems, there is nevertheless substantial computational difficulty in combining the multiple signals into a single signal. The present invention provides for much improved correlation matrix processing to combine the multiple signals into a single output signal that is provided for subsequent signal processing.

For example, the outputs from the antennae (the antenna #1 211, ..., and the antenna #n 219) are all provided to a receiver 220. Specifically, within the receiver 220, a functional block 222 that performs multi-signal combination receives all of the outputs from the antenna 211-219. The functional block 222 may be performed using a dedicated application specific integrated circuit (ASIC), one or more other circuitries that operate cooperatively, a programmable circuitry (such a field programmable logic array (FPGA) circuitry). Alternatively, the functionality of the functional block 222 may be performed via software using any number of programmable devices. The functionality within the functional block 222 provides for improved correlation matrix processing, as shown by the functional block 224. As will be shown, the improved correlation matrix processing 224 is achieved using square root factorization of the auto-correlation matrix to provide for simplified and more efficient computational implementation. A single signal is provided from the functional block 222, that performs multi-signal combination, and provides that single signal to one or more functional blocks 228 that is/are operable to perform subsequent signal processing within the receiver 220. The present invention is adaptable to combine multiple signals in a variety of contexts; while the particular context of a wireless receiver system is shown in this embodiment, those persons having skill in the art will appreciate that the present invention is applicable within other embodiments seeking to combine multiple received signals into a single signal as well.

Figure 3:
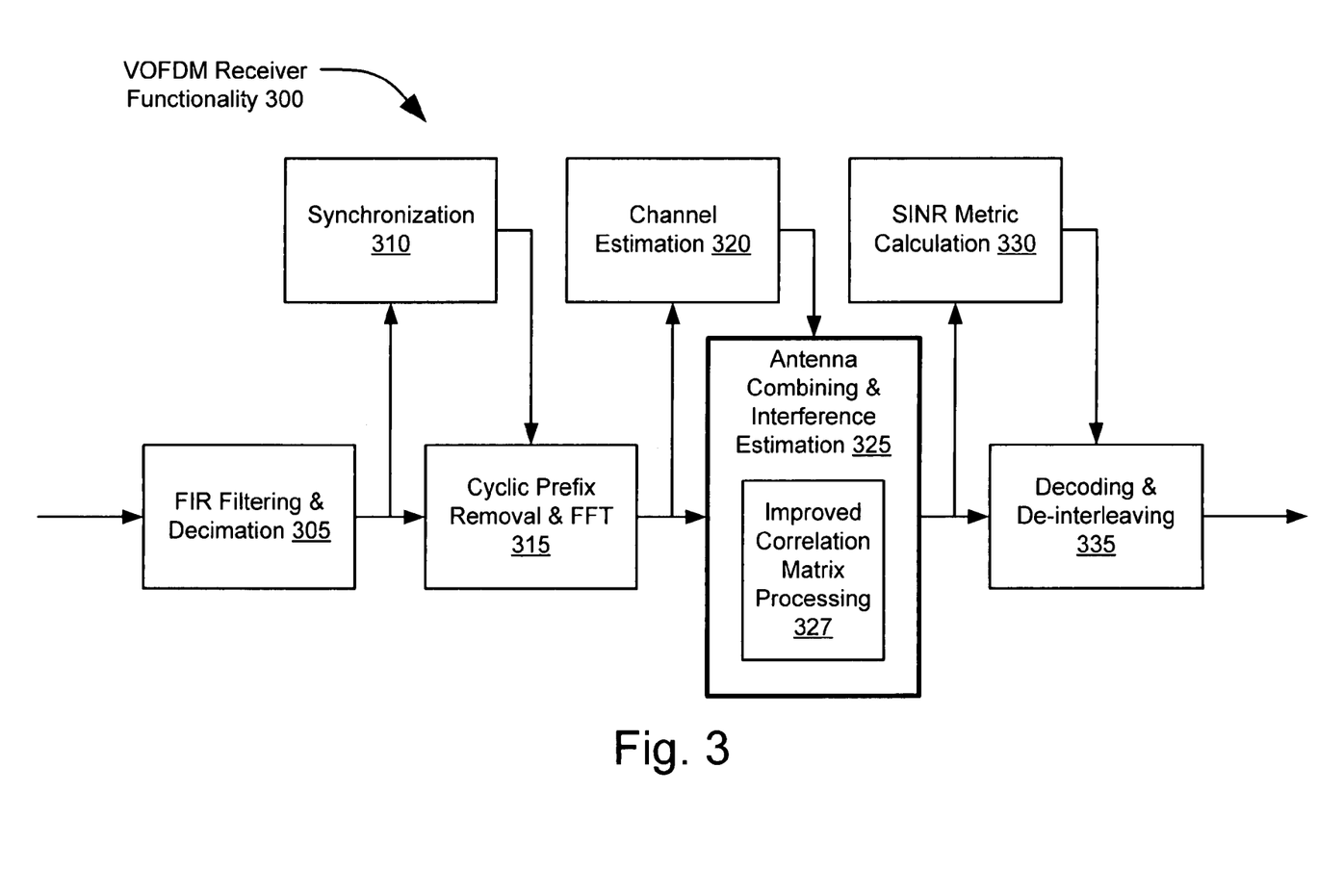
FIG. 3 is a functional block diagram illustrating an embodiment of vector orthogonal frequency division multiplexing (VOFDM) receiver functionality that operates in accordance with certain aspects of the present invention.

FIG. 3 is a functional block diagram illustrating an embodiment of vector orthogonal frequency division multiplexing (VOFDM) receiver functionality 300 that operates in accordance with certain aspects of the present invention. The VOFDM embodiment is an extension of the orthogonal frequency division multiplexing (OFDM) that has been extended into an optimum spatial-temporal processing system for the dispersive spatially selective wireless channel. The resulting system is known as VOFDM. The FIG. 3 shows an embodiment of the receiver system block within the VOFDM context. The VOFDM combines OFDM with spatial processing. In the combined system, OFDM is used to exploit time and frequency diversity whereas spatial processing exploits spatial diversity. Some benefits comes from exploiting time, frequency, and spatial diversity. Within the OFDM embodiments, the data rate and the delay spread tolerance are programmable. Initially, one or more received signal undergo finite impulse response (FIR) filtering and decimation in the functional block 305.

The output of the functional block 305 is simultaneously provided to a functional block 315 that performs fast Fourier transform (FFT) on the signals and cyclic and linear filtering by employing optimal FIR filters and also to a functional block 310 that performs synchronization where both timing and frequency recovery are performed in a robust manner. The output of the functional block 310, that performs synchronization, is also provided to the functional block 315 as well. The output from the functional block 315 is simultaneously provided to a functional block 320 that performs channel estimation where an optimum approach is used employing burst-mode training and also to a functional block 325 that performs antenna combining and interference estimation. The output of the functional block 320, that performs channel estimation, is also provided to the functional block 325 as well. The functional block 325 performs improved correlation matrix processing, as shown by the functional block 327. The functionality of the functional block 325 may also be viewed as spatial processing within the context of the VOFDM system. From other perspectives within the VOFDM system, the spatial processing is known as interference cancellation. The combined signal, output from the functional block 325, is provided to decoding functional blocks 330 and 335. In some embodiments, both convolutional and Reed-Solomon coding are used in a concatenated fashion. Optimum soft decoding is used in Viterbi decoding by incorporating measured signal-to-interference-plus-noise ratio (SFNR) weights for every transmitted bit as shown in a functional block 330. Decoding and de-interleaving are performed within a functional block 335.

The output of the functional block 325 may be viewed as being a beam form soft decision of the multiple signal paths that are combined into a single "beam" that is representative of the combination of all of the multiple signal paths. The FIG. 3 helps place the functionality of the present invention within the context of a receiver system block employing VOFDM. The improved correlation matrix processing, shown in the functional block 327, is used to perform more efficient combination of the one or more signals that are received by one or more antennae and that must be combined into a single signal.

Figure 4:
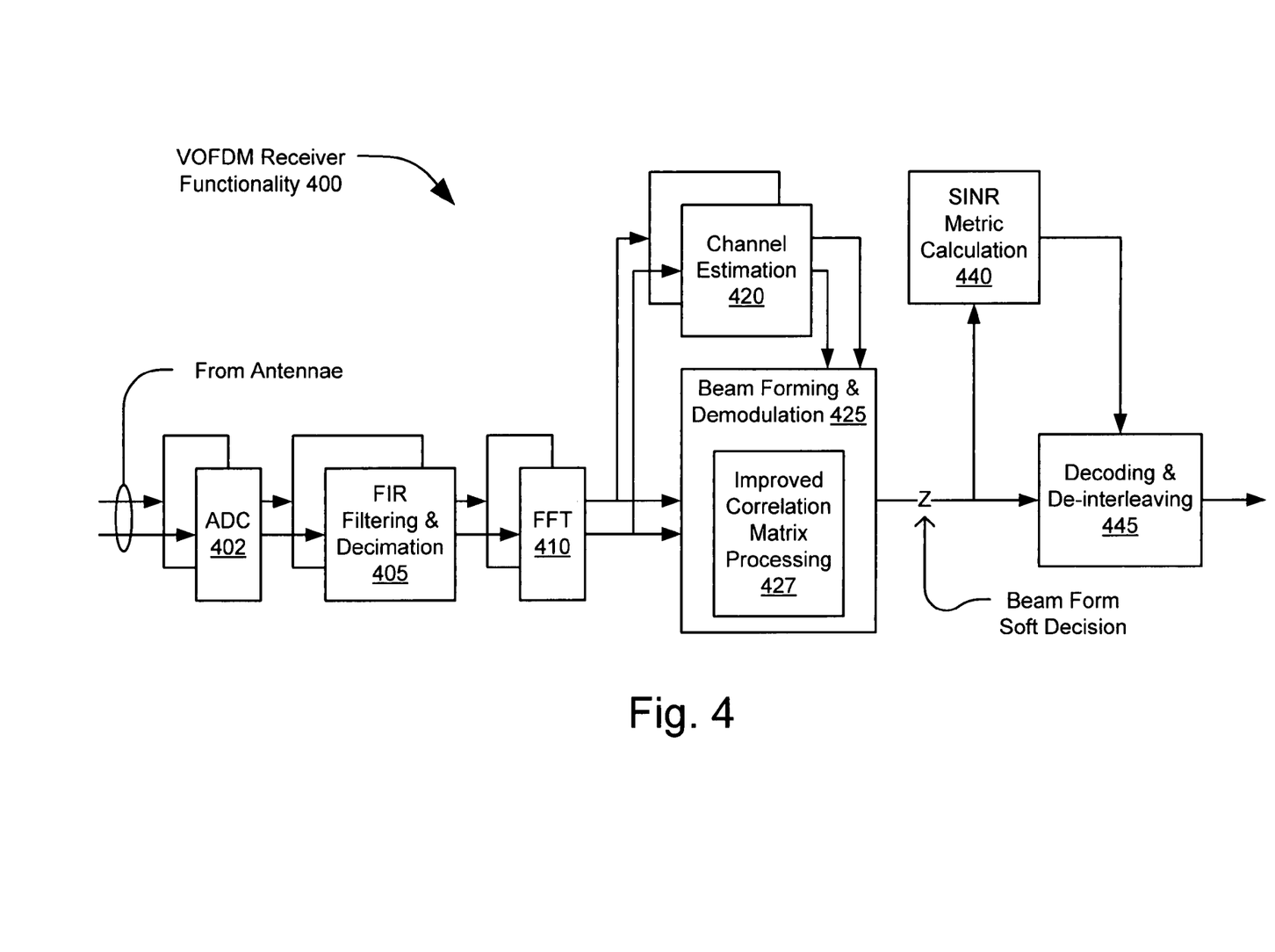
FIG. 4 is a functional block diagram illustrating another embodiment of vector orthogonal frequency division multiplexing (VOFDM) receiver functionality that operates in accordance with certain aspects of the present invention.

FIG. 4 is a functional block diagram illustrating another embodiment of vector orthogonal frequency division multiplexing (VOFDM) receiver functionality 400 that operates in accordance with certain aspects of the present invention. Two signals are provided from antennae to analog to digital converters (ADC) 402 and subsequent to functional blocks 405 that performs finite impulse response (FIR) filtering and decimation. The output of the functional blocks 405 is provided to functional blocks 415 that perform fast Fourier transform (FFT) on the signals and as shown within a functional block 410. The output of the functional block 410, that performs the FFT, is provided to functional blocks 420 that perform synchronization. The output from the functional block 410 is also simultaneously provided to a functional block 425 that performs beam forming and demodulation. The output of the functional block 420, that performs channel estimation, is also provided to the functional block 425 as well. The functional block 425 performs improved correlation matrix processing, as shown by the functional block 427. The functionality of the functional block 425 may similarly also be viewed as another aspect of the spatial processing within the context of the VOFDM system. From other perspectives within the VOFDM system, the spatial processing is known as interference cancellation. The combined signal, output from the functional block 425, is provided to decoding functional blocks 440 and 445; this combined signal may be viewed as the beam form soft decision within the context of the VOFDM system. Again, optimum soft decoding is used in Viterbi decoding by incorporating measured signal-to-interference-plus-noise ratio (SINR) weights for every transmitted bit as shown in a functional block 440. Decoding and de-interleaving are performed within a functional block 445.

Similarly, the output of the functional block 445, the beam form soft decision, is the combination of the multiple signal paths that are combined into a single "beam" that is representative of the combination of all of the multiple signal paths. The FIG. 5 helps place the functionality of the present invention within the context of VOFDM receiver functionality. The improved correlation matrix processing, shown in the functional block 427, is used to perform more efficient combination of the one or more signals that are received by one or more antennae and that must be combined into a single signal. The FIG. 4 may also be viewed as the context of a wireless modem that contains radio frequency (RF) and intermediate frequency (IF) transceivers that translate the data between RF and baseband. The wireless modem's baseband processor performs all of the VOFDM physical layer (PHY) and Data-Over-Cable Service Interface Specifications Operations Support System Interface (DOCSIS) media access controller (MAC) layer processing; the receiver portion of the processing is shown in the FIG. 4.

One embodiment of the mathematical processing performed to combine the multiple signals into a single signal is described below. Using the dual antenna embodiment as an example, a correlation matrix R (including noise estimates $\sigma_1$ for a path #1 signal path, $\sigma_2$ for a path #2 signal path, and $\sigma_{12}$ for the cross-coupled noise estimate between the two signal paths) is generated as shown below. The $\sigma_{12}^*$ indicates the complex conjugate of the $\sigma_{12}$ noise estimate.

$$R = \begin{bmatrix} \sigma_1^2 & \sigma_{12} \\ \sigma_{12}^* & \sigma_2^2 \end{bmatrix}$$

The matrix R may be factorized as follows:

$$R = (R^{1/2})' R^{1/2}$$

where ( )' indicates the transpose complex conjugate with the following definitions for $R^{1/2}$.

$$R^{1/2} = \begin{bmatrix} \sigma_1 & \sigma_{12}/\sigma_1 \\ 0 & \left(\sigma_2^2 - \frac{|\sigma_{12}|^2}{\sigma_1^2}\right)^{1/2} \end{bmatrix}$$

The matrix $R^{1/2}$ may also be described as shown below.

$$R^{1/2} = \begin{bmatrix} \sigma_1 & \sigma_{12}/\sigma_1 \\ 0 & \sigma_2\left(1 - \frac{|\sigma_{12}|^2}{\sigma_1^2 \sigma_2^2}\right)^{1/2} \end{bmatrix}$$

The inverse of R, shown as $R^{-1}$, may be reduced as shown below in the factorization process.

$$R^{-1} = (R^{1/2})^{-1}((R^{1/2})')^{-1}$$

Continuing on, the inverse of the square root of R, shown as $(R^{1/2})^{-1}$, may also be described as shown below.

$$(R^{1/2})^{-1} = \begin{bmatrix} \sigma_2\left(1 - \frac{|\sigma_{12}|^2}{\sigma_1^2 \sigma_2^2}\right)^{1/2} & -\sigma_{12}/\sigma_1 \\ 0 & \sigma_1 \end{bmatrix} \Big/ det(R^{1/2})$$

The denominator of the equation above may be described as follow using the noise estimates described above, again using $\sigma_1$ for a path #1 signal path, $\sigma_2$ for a path #2 signal path, and $\sigma_{12}$ for the cross-coupled noise estimate between the two signal paths.

$$det(R^{1/2}) = \sigma_1 \left(\sigma_2^2 - \frac{|\sigma_{12}|^2}{\sigma_1^2}\right)^{1/2}$$

As described above in several of the various embodiments of the present invention, the beam form soft decision, Z, is used to perform the actual beam forming during the combining process of the multiple signals into a single signal that is used for any subsequent signal processing.

$$Z = \frac{X'R^{-1}Y}{X'R^{-1}X}$$

The vector Y may be viewed as the actual data that are received at the communication receiver. The vector X may be viewed as the communication channel's response/estimate. The vector X may also be viewed as being the output of the channel estimator. The beam form soft decision, Z, is rewritten as shown below including the vectors X and Y, as well as the noise estimates described above.

$$Z = \frac{(x_1^* x_2^*)\begin{pmatrix} \sigma_2^2 & -\sigma_{12} \\ -\sigma_{12}^* & \sigma_1^2 \end{pmatrix}\begin{pmatrix} y_1 \\ y_2 \end{pmatrix}}{(x_1^* x_2^*)\begin{pmatrix} \sigma_2^2 & -\sigma_{12} \\ -\sigma_{12}^* & \sigma_1^2 \end{pmatrix}\begin{pmatrix} x_1 \\ x_2 \end{pmatrix}}$$

By taking the inverse of the correlation matrix $R^{-1}$ in both the numerator and denominator, it is seen that the det(R) may be eliminated. After further simplification, the beam form soft decision, Z, may be even further simplified as shown below.

$$Z = \frac{x_1^* y_1 \sigma_2^2 - x_2^* y_1 \sigma_{12}^* - x_1^* y_2 \sigma_{12} + x_2^* y_2 \sigma_1^2}{|x_1|^2 - 2Re(x_1^* x_2 \sigma_{12}) + |x_2|^2 \sigma_1^2}$$

Some intermediate variables are employed to provide even further simplification to the mathematical calculations. For example, the intermediate variables r and ρ are employed. They are defined as shown below.

$$r = \left(1 - \frac{|\sigma_{12}|^2}{\sigma_1^2 \sigma_2^2}\right)^{1/2} = (1 - \rho^2)^{1/2}$$

$$\rho = \frac{|\sigma_{12}|}{\sigma_1 \sigma_2}$$

Using square root factorization on the beam form soft decision, Z, it may be re-written as shown below.

$$Z = \frac{X'(R^{1/2})^{-1}((R^{1/2})')^{-1}Y}{X'(R^{1/2})^{-1}((R^{1/2})')^{-1}X}$$

Inserting the vectors X and Y, as well as the noise estimates described above (as expressed in terms of the intermediate variables r and ρ), into the beam form soft decision, Z, it may be re-written as shown below.

$$Z = \frac{(x_1^* x_2^*)\begin{pmatrix} \sigma_2 r & \frac{-\sigma_{12}}{\sigma_1} \\ 0 & \sigma_1 \end{pmatrix}\begin{pmatrix} \sigma_2 r & 0 \\ \left(\frac{-\sigma_{12}^*}{\sigma_1}\right) & \sigma_1 \end{pmatrix}\begin{pmatrix} y_1 \\ y_2 \end{pmatrix}}{(x_1^* x_2^*)\begin{pmatrix} \sigma_2 r & \frac{-\sigma_{12}}{\sigma_1} \\ 0 & \sigma_1 \end{pmatrix}\begin{pmatrix} \sigma_2 r & 0 \\ \left(\frac{-\sigma_{12}^*}{\sigma_1}\right) & \sigma_1 \end{pmatrix}\begin{pmatrix} x_1 \\ x_2 \end{pmatrix}}$$

After multiplying the above expression out, it is seen that the beam form soft decision, Z, may be expressed as shown below. When employing fixed-point arithmetic, the present invention provides for less dynamic range thereby providing better resolution in the calculations.

$$Z = \frac{(x_1^* \sigma_2 r - x_1^* \sigma_2 \rho + x_2^* \sigma_1)\begin{pmatrix} y_1 \sigma_2 r \\ -y_1 \sigma_2 \rho^* + y_2 \sigma_1 \end{pmatrix}}{(x_1^* \sigma_2 r - x_1^* \sigma_2 \rho + x_2^* \sigma_1)\begin{pmatrix} x_1 \sigma_2 r \\ -x_1 \sigma_2 \rho^* + x_2 \sigma_1 \end{pmatrix}}$$

$$= \frac{(x_1^* \sigma_2 r - x_1^* \sigma_2 \rho + x_2^* \sigma_1)\begin{pmatrix} y_1 \sigma_2 r \\ -y_1 \sigma_2 \rho^* + y_2 \sigma_1 \end{pmatrix}}{DEN}$$

The denominator of the above equation for Z (shown as DEN) is used in other equations shown below as well.

In performing the signal processing of a received signal, the average of the quality factor, q, is yet another expression that is employed. It may also benefit from the simplification shown and described herein using the intermediate variables.

$$\bar{q} = \frac{\alpha(\sigma_1^2 \sigma_2^2 - |\sigma_{12}|^2)}{DEN}$$

$$\bar{q} = \frac{\alpha(\sigma_1^2 \sigma_2^2)\left(1 - \frac{|\sigma_{12}|^2}{\sigma_1^2 \sigma_2^2}\right)}{DEN} = \frac{\alpha(\sigma_1^2 \sigma_2^2)(1 - |\rho|^2)}{DEN}$$

Therefore, using square root factorization, the values of $\sigma_1^2$, $\sigma_2^2$ and $\sigma_{12}$ are used to find the values of $\sigma_1$, $\sigma_2$, and the intermediate variables r and ρ. Then, these values are used to find the beam form soft decision, Z, and the average of the quality factor q, rather than using the expressions for $\sigma_1^2$, $\sigma_2^2$ and $\sigma_{12}$ directly.

It is noted that in the BWIF processing, $\sigma_1^2$, $\sigma_2^2$ and $\sigma_{12}$ values in the $\bar{q}$ computation are, in general, time averaged and are thus not exactly the same as the $\sigma_1$, $\sigma_2$, and $\sigma_{12}$ used in the computation of Z.

For the dual antenna embodiments, there is savings in computational complexity. However, for even higher order matrices, the reduction in complexity is very significant in terms of the number of calculation steps that are required. There are also significant other advantages. In terms of numerical advantages, the precision and the effects provided by using a more finite word width, that accompany the factorization approach, are great given that the dynamic range of the intermediate variables is significantly reduced.

To compare the prior art approach that uses no factorization with the embodiments of the present invention that do employ factorization (without factorization), the following comparison is made. The prior art approach, using no factorization to calculate beam form soft decision, Z, is shown below.

$$Z = \frac{x_1^* y_1 \sigma_2^2 - x_2^* y_1 \sigma_{12}^* - x_1^* y_2 \sigma_{12} + x_2^* y_2 \sigma_1^2}{|x_1|^2 \sigma_2^2 - 2\,Re(x_1^* x_2 \sigma_{12}) + |x_2|^2 \sigma_1^2}$$

However, by employing the factorization (with factorization) included within the scope and spirit of the invention of the present invention to calculate beam form soft decision, Z, is shown below.

$$Z = \frac{\begin{matrix} x_1^* y_1 \sigma_2 \sigma_2 r - x_2^* y_1 \sigma_1 \sigma_2 \rho^* - x_1^* y_2 \sigma_1 \sigma_2 \rho - \\ x_1^* y_1 \sigma_2 \sigma_2 \rho \rho^* + x_2^* y_2 \sigma_1 \sigma_1 \end{matrix}}{\begin{matrix} x_1^* x_1 \sigma_2 \sigma_2 r - x_2^* x_1 \sigma_1 \sigma_2 \rho^* - x_1^* x_2 \sigma_1 \sigma_2 \rho - \\ x_1^* x_1 \sigma_2 \sigma_2 \rho \rho^* + x_2^* x_2 \sigma_1 \sigma_1 \end{matrix}}$$

The ordering of the calculations in the above referenced equation may be viewed as being a more efficient manner of expressing the beam form soft decision, Z, that is typically calculated using the vector components as shown in the following expression.

$$Z = \frac{(x_1^* \sigma_2 r - x_1^* \sigma_2 \rho + x_2^* \sigma_1)\begin{pmatrix} y_1 \sigma_2 r \\ -y_1 \sigma_2 \rho^* + y_2 \sigma_1 \end{pmatrix}}{(x_1^* \sigma_2 r - x_1^* \sigma_2 \rho + x_2^* \sigma_1)\begin{pmatrix} x_1 \sigma_2 r \\ -x_1 \sigma_2 \rho^* + x_2 \sigma_1 \end{pmatrix}}$$

It is also noted that the numerical stability of the prior art approach (without factorization) is often an operational concern. This is particularly an issue when $|\sigma_{12}|^2 \approx \sigma_1^2 \cdot \sigma_2^2$ in the prior art approaches. However, using the square root approach employing factorization within the scope and spirit of the invention, and by limiting the minimum value of r to be some small number, but greater than zero, and larger than the minimal smallest allowed within the computations. This allows the square root factorization approach to be more stable that the prior art approaches. In certain embodiments, a programmed minimal value of r may be set so that a minimal value may never approach zero. The present invention provides for a more efficient implementation of correlation matrix processing when compared to the prior art approaches. It will also be understood by those persons having skill in the art that as the number of antennae increases in a given embodiment, the computational processing savings that are provided within the scope and spirit of the present invention become significantly greater.

Figure 5:
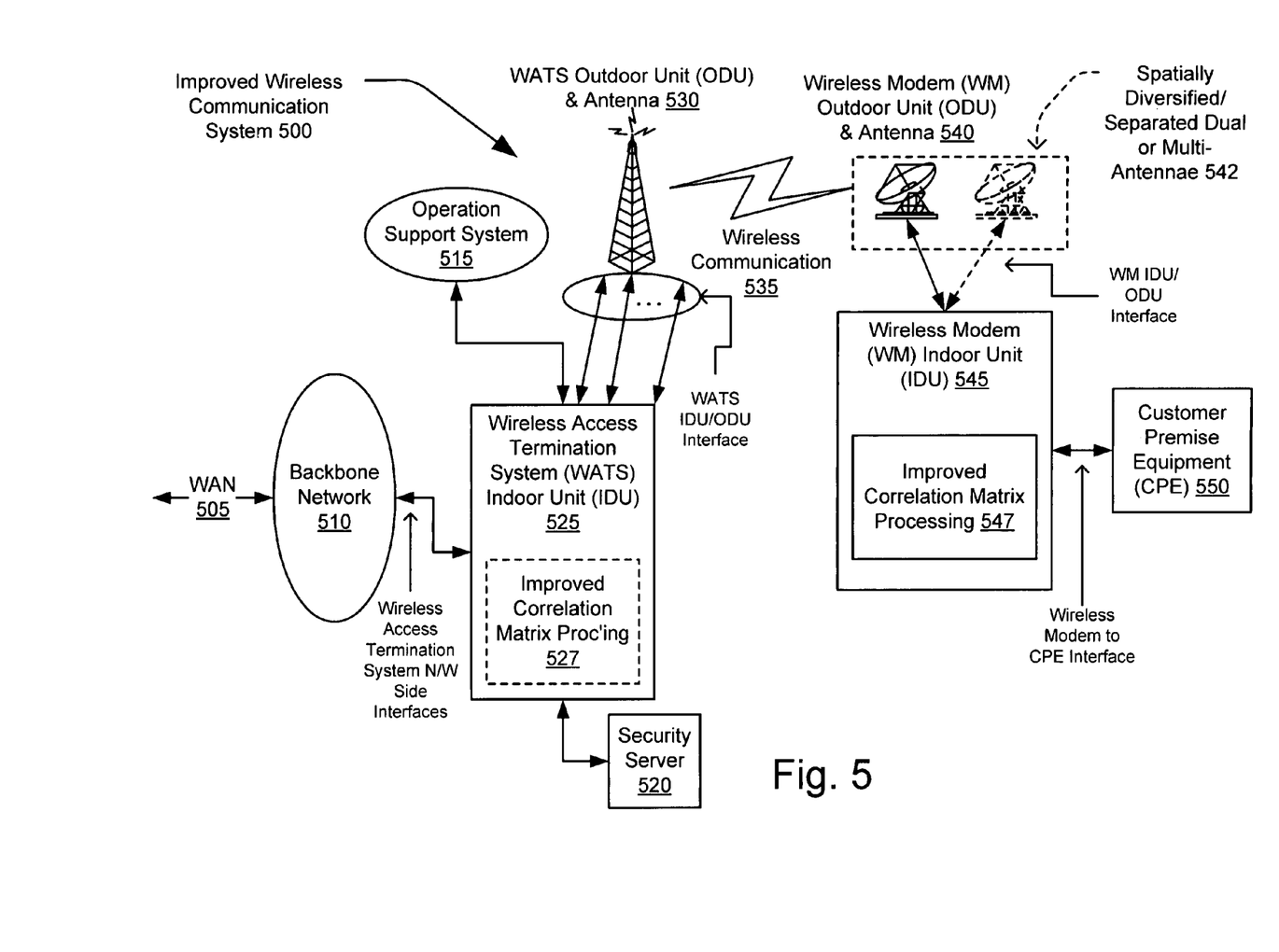
FIG. 5 is a system diagram illustrating an embodiment of an improved wireless communication system that is built in accordance with certain aspects of the present invention.

FIG. 5 is a system diagram illustrating an embodiment of an improved wireless communication system 500 that is built in accordance with certain aspects of the present invention. The present invention is operable within the improved wireless communication system 500 that employs the vector orthogonal frequency division multiplexing (VOFDM) portion of the broadband wireless Internet forum (BWIF) standard set. Again, the VOFDM standard defines the physical layer and additional layers in which a plurality, e.g., up to 1,024 separate carriers (tones) carry either data (data tones) or training/pilot signals (training/pilot tones). The 1,024 tones are separated in frequency such that they are orthogonal to one another. The VOFDM standard also defines a multiple antenna receive path that combines the signal received via each of the antennae using a combining methodology. In the receiver of a VOFDM device (sometimes referred to as a wireless modem (WM) indoor unit (IDU)), a decision block maps incoming voltage signals corresponding to a particular symbol to a modulation constellation in order to extract bits carried by the symbol.

Here, the present invention is operable to provide for improved correlation matrix processing of the received voltage signal that is provided to a wireless modem (WM) indoor unit (IDU) 545; improved correlation matrix processing (as shown in functional block 547) is performed within the WM IDU 545 is performed, as necessary, to ensure proper demodulation/decoding of the signals received by the WM IDU 545. In certain embodiments, improved correlation matrix processing (as shown in functional block 527) is also performed within the wireless access termination system (WATS) indoor unit (IDU) 525 is performed, as necessary, to ensure proper demodulation/decoding of the signals received by the WM IDU 545.

The improved wireless communication system 500 may be viewed in light of the wireless communication system reference architecture of the BWIF; the present invention provides for improved signal processing within the WM IDU 545. A wide area network 505 communicatively couples to a backbone network 510. The backbone network 510 in turn communicatively couples to a WATS IDU 525. The WATS IDU 525 is serviced via operation system support 515 and a security server 520. The WATS IDU 525 is operable to communicate with a WATS outdoor unit (ODU) and antenna 530 using one or more signals. The present invention implements vector orthogonal frequency division multiplexing (VOFDM) where the signal is partitioned among a number of frequencies. The WATS ODU 530 communicates with a wireless modem (WM) outdoor unit (ODU) and antenna 540 via wireless communication 535. If desired, the WM ODU and antenna 540 is implemented in a spatially diversified/separated dual or multi-antennae implementation 542. The improved correlation matrix processing 547 is especially desirable within embodiments employing multiple antennae, yet it is adaptable also to accommodate those embodiments that include only a single antenna without suffering any deleterious functional effects.

The WM ODU and antenna 540 provides the one or more signals to the WM IDU 545 that is operable to perform improved correlation matrix processing using the functional block 547. The WM IDU 545 communicatively couples to a customer premises equipment (CPE) 550. The FIG. 5 shows just one embodiment where a communication system may benefit from the functionality offered by the present invention in performing improved correlation matrix processing at the receiver end of a communication system.

It is noted that the functionality offered by the present invention may be performed in both transmit/receive paths without departing from the scope and spirit of the invention, as shown by the functionality within the functional blocks 547 and 527.

Figure 6:
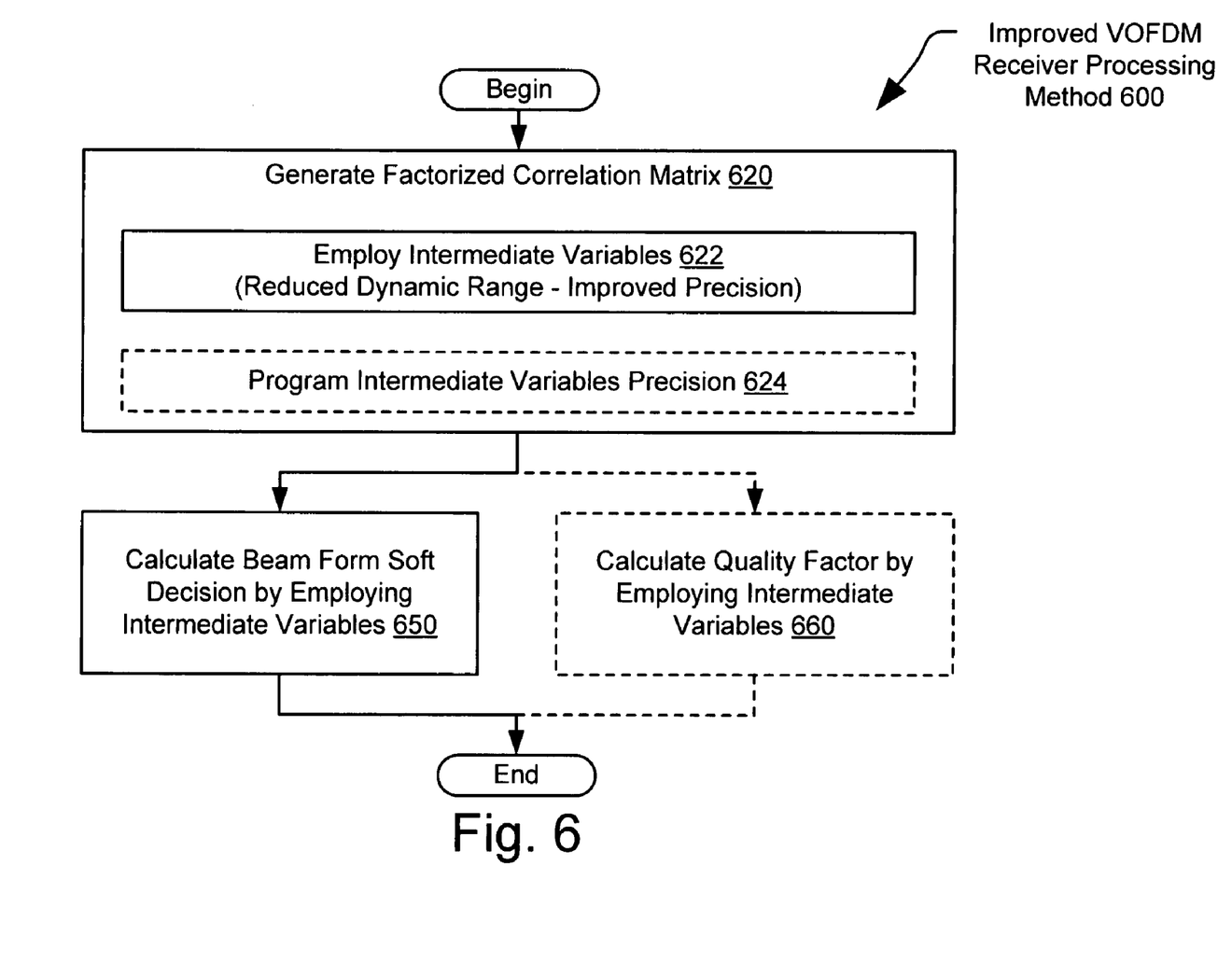
FIG. 6 is an operational flow diagram illustrating an embodiment of an improved vector orthogonal frequency division multiplexing (VOFDM) receiver processing method that is performed in accordance with certain aspects of the present invention.

FIG. 6 is an operational flow diagram illustrating an embodiment of an improved vector orthogonal frequency division multiplexing (VOFDM) receiver processing method 600 that is performed in accordance with certain aspects of the present invention. In a block 620, a factorized correlation matrix is generated. This factorized correlation matrix is generated using intermediate variables, as shown in a block 622 within the block 620, that ensures a reduced dynamic range of intermediate value calculations. If desired, as shown in a block 624, the dynamic range of intermediate value calculations is programmed thereby governing, ultimately, the precision of a beam form soft decision, Z. Then, in a block 650, the beam form soft decision, Z, is calculated using the intermediate variables. In addition, in some embodiments, the average of the quality factor is calculated using the intermediate variables as well. These intermediate values ensure greater and improved precision of the overall calculations of the beam form soft decision, Z, and the quality factor.

Figure 7:
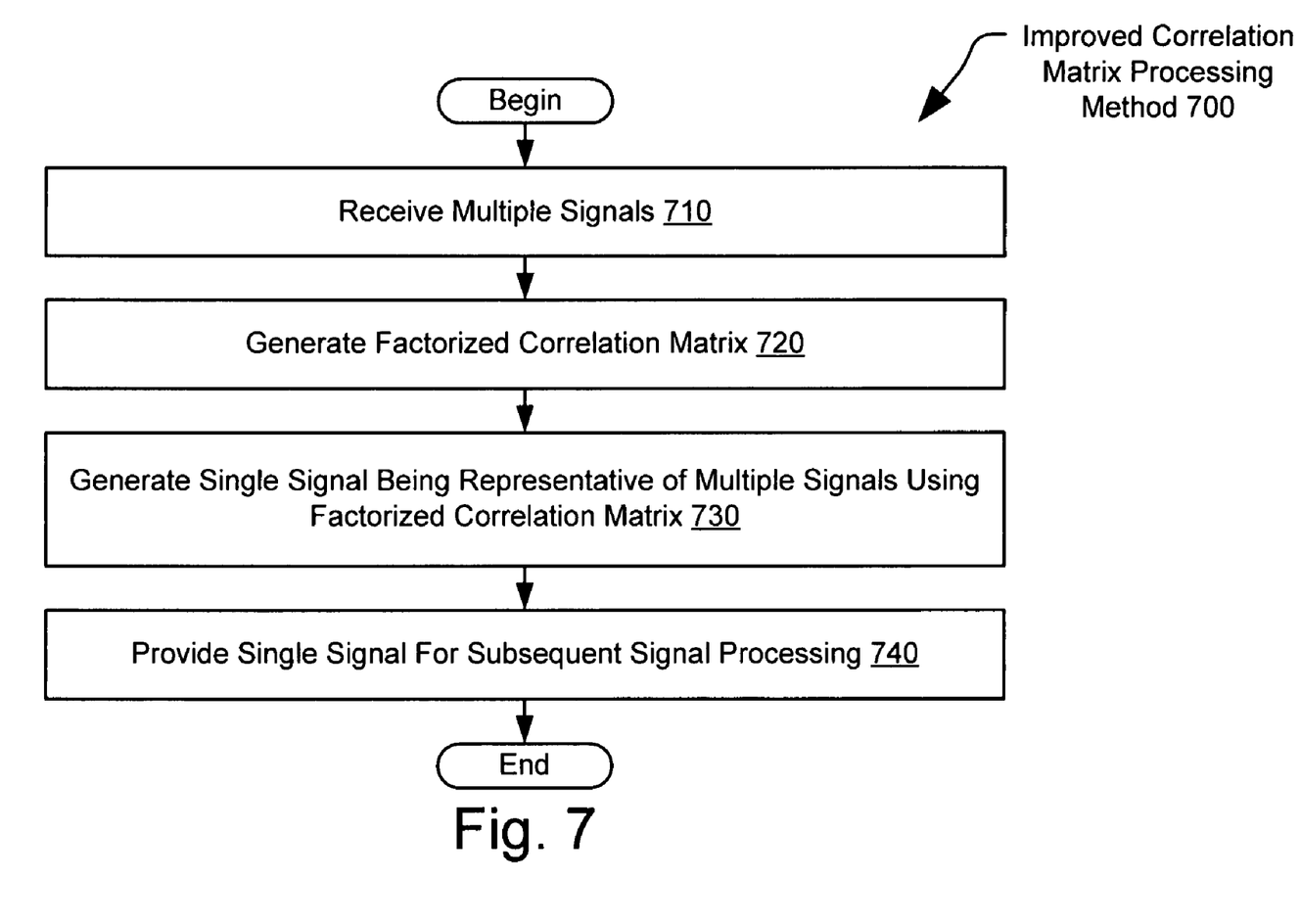
FIG. 7 is an operational flow diagram illustrating an embodiment of an improved correlation matrix processing method that is performed in accordance with certain aspects of the present invention.

FIG. 7 is an operational flow diagram illustrating an embodiment of an improved correlation matrix processing method 700 that is performed in accordance with certain aspects of the present invention. In a block 710, multiple signals are received. Then, using the noise estimates of the multiple signals received in the block 710, a factorized correlation matrix is generated in a block 720. In a block 730, a single signal is generated using the factorized correlation matrix. The single signal is representative of the multiple signals. Ultimately, in a block 740, the single signal is provided for subsequent signal processing.

Figure 8:
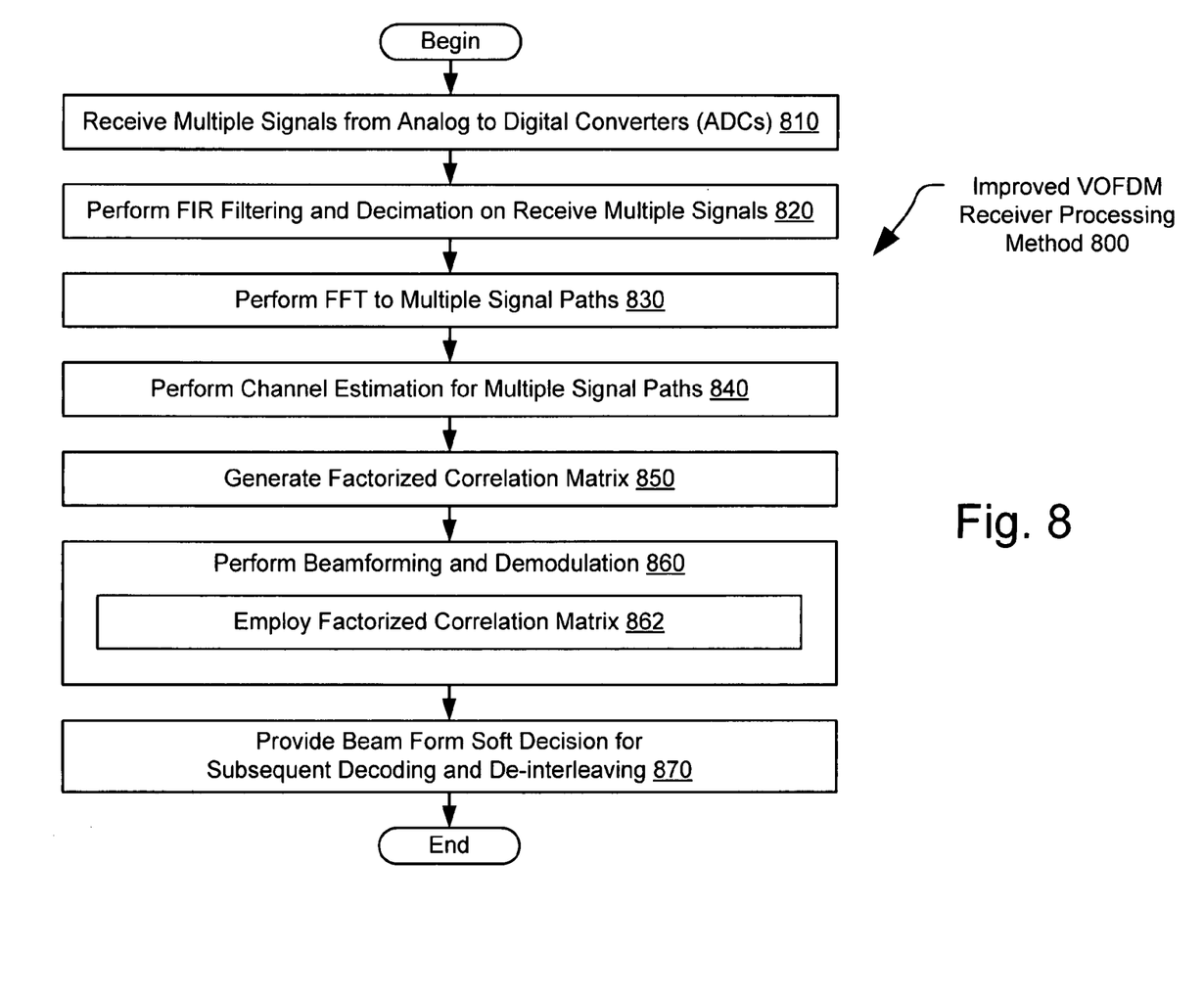
FIG. 8 is an operational flow diagram illustrating another embodiment of an improved vector orthogonal frequency division multiplexing (VOFDM) receiver processing method that is performed in accordance with certain aspects of the present invention.

FIG. 8 is an operational flow diagram illustrating another embodiment of an improved vector orthogonal frequency division multiplexing (VOFDM) receiver processing method 800 that is performed in accordance with certain aspects of the present invention. In a block 810, multiple signals are received from a number of analog to digital converters (ADCs). In certain embodiments, each antenna in a wireless receiver is communicatively coupled to an ADC. Each of these ADCs provide an output signal. Finite impulse response filtering and decimation are performed in each of the received multiple signals in a block 820. Afterwards, a fast Fourier transform (FFT) is performed on the multiple signal paths in a block 830. A channel estimation is made for each of the multiple signal paths as well in a block 840. A factorized correlation matrix is generated in a block 850.

Beamforming and demodulation are performed in a block 860. In a block 862, the beamforming and demodulation are performed using the factorized correlation matrix that is generated in a block 860. In a block 870, a beam form soft decision, Z, is calculated, and the result is provided for subsequent decoding and de-interleaving within receiver signal processing.

While various embodiments of the present invention have been shown within the context of a vector orthogonal frequency division multiplexing (VOFDM) or a VOFDM communication system, those persons having skill in the art will appreciate that the present invention may be extended to any combinatorial system that seeks to combine multiple signals into a single signal to perform subsequent signal processing. In the context of a wireless communication system, the combination is perform the beam forming of a single signal that is representative of all of the potentially various signal, taking perhaps different signal paths, that are received by a receiver. This formed beam may be viewed as the composite beam that is representative of the composite of all of the beams that have taken the various signal paths. In addition, the present invention is adaptable to non-wireless, wireline systems. The present invention envisions embodiments where multiple wirelines may be used to provide redundancy. The present invention is also able to perform the functionality to combine those multiple signals into a single composite signal.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. A communication device that employs vector orthogonal frequency division multiplexing (VOFDM), the communication device comprising:
a plurality of antennae that is operable to receive a plurality of continuous time signals from a multi-path communication channel;
a beam forming and demodulation module that is operable to:
estimate noise for each path within the multi-path communication channel;
generate a correlation matrix that includes a plurality of noise estimates corresponding to each path within the multi-path communication channel;
perform square root factorization to the correlation matrix to generate a factorized correlation matrix; and
employ the factorized correlation matrix to combine the plurality of continuous time signals into a single signal that includes a beam form soft decision.

2. The communication device of claim 1, further comprising:
a plurality of ADCs (Analog to Digital Converters) that is operable to sample each of the plurality of continuous time signals that is received from the plurality of antennae thereby generating a plurality of discrete time signals;
a plurality of finite impulse response (FIR) filtering and decimation blocks that is operable to perform FIR filtering and decimation to each of the plurality of discrete time signals thereby generating a plurality of FIR signals; and
a plurality of fast Fourier transform (FFT) blocks that is operable to transform each of the plurality of FIR signals from the time domain to the frequency domain and to provided the plurality of transformed signals to the beam forming and demodulation module.

3. The communication device of claim 2, further comprising:
a plurality of channel estimation blocks that is operable to make a channel estimate of at least one path within the multi-path communication channel by processing the frequency domain plurality of FIR signals output from the plurality of FFT blocks and to provide the channel estimate to the beam forming and demodulation module.

4. The communication device of claim 1, further comprising:
a decoder block; and
a de-interleaver block; and wherein:
the beam form soft decision is provided to the decoder block and to the de-interleaver block.

5. The communication device of claim 1, further comprising:
a decoder block;
a de-interleaver block; and
a signal-to-interference-plus-noise ratio (SINR) metric calculation block; and wherein:
the beam form soft decision is provided to the decoder block, the de-interleaver block, and the SINR metric calculation block; and
the SINR metric calculation block is operable to calculate SINR a weight for each transmitted bit of the single signal and to provide those weights to each of the decoder block and the de-interleaver block.

6. The communication device of claim 1, wherein:
the beam forming and demodulation module is operable to:
estimate cross-coupled noise between each of the paths within the multi-path communication channel; and
generate the correlation matrix such that the correlation matrix also includes a plurality of cross-coupled noise estimates corresponding to cross-coupling between each of the paths within the multi-path communication channel.

7. The communication device of claim 1, wherein:
the plurality of antennae is configured in a spatially diversified manner.

8. The communication device of claim 1, wherein:
the beam forming and demodulation module that is operable to employ a plurality of intermediate variables, at least one of which is a function of the noise for at least one path within the multi-path communication channel, to generate the correlation matrix.

9. The communication device of claim 1, wherein:
the beam forming and demodulation module that is operable to:
employ a plurality of intermediate variables, at least one of which is a function of the noise for at least one path within the multi-path communication channel, to generate the correlation matrix;
employ fixed-point arithmetic to generate the correlation matrix; and wherein:
a dynamic range of at least one of the intermediate variables governs precision of the beam form soft decision; and
the precision of the beam form soft decision increases as the dynamic range of the at least one of the intermediate variables decreases.

10. The communication device of claim 1, wherein:
the communication device is a wireless modem (WM) indoor unit (IDU).

11. The communication device of claim 1, wherein:
the communication device is a wireless access termination systems (WATS) indoor unit (IDU).

12. A communication device, the communication device comprising:
a plurality of antennae that is operable to receive a plurality of continuous time signals from a multi-path communication channel;
a multi-signal combination block that is operable to:
receive the plurality of continuous time signals from the plurality of antennae;
process the plurality of continuous time signals thereby generating a plurality of processed signals; and
employ a factorized correlation matrix to combine the plurality of processed signals to generate a beam form soft decision that corresponds to the multi-path communication channel; and wherein:
the factorized correlation matrix is generated from a correlation matrix that includes a plurality of noise estimates corresponding to each path within the multi-path communication channel using square root factorization.

13. The communication device of claim 12, wherein:
the communication device employs vector orthogonal frequency division multiplexing (VOFDM).

14. The communication device of claim 12, wherein:
the communication device is coupled to customer premise equipment.

15. The communication device of claim 12, wherein:
the multi-signal combination block is operable to:
estimate noise for each path within the multi-path communication channel;
estimate cross-coupled noise between each of the paths within the multi-path communication channel;
generate the correlation matrix that includes the plurality of noise estimates corresponding to each path within the multi-path communication channel, wherein the correlation matrix also includes a plurality of cross-coupled noise estimates corresponding to cross-coupling between each of the paths within the multi-path communication channel; and perform the square root factorization to the correlation matrix to generate the factorized correlation matrix.

16. The communication device of claim 15, wherein:

the multi-signal combination block is operable to:

employ a plurality of intermediate variables, at least one of which is a function of the noise for at least one path within the multi-path communication channel, to generate the correlation matrix;

employ fixed-point arithmetic to generate the correlation matrix; and wherein:

a dynamic range of at least one of the intermediate variables governs precision of the beam form soft decision; and the precision of the beam form soft decision increases as the dynamic range of the at least one of the intermediate variables decreases.

17. The communication device of claim 12, wherein:

the communication device is a wireless modem (WM) indoor unit (IDU).

18. A receiver processing method, the method comprising:

receiving a plurality of continuous time signals from a multi-path communication channel;

processing the plurality of continuous time signals thereby generating a plurality of processed signals;

performing square root factorization to a correlation matrix, that includes a plurality of noise estimates corresponding to each path within the multi-path communication channel, to generate a factorized correlation matrix; and employing the factorized correlation matrix to combine the plurality of processed signals to generate a beam form soft decision that corresponds to the multi-path communication channel.

19. The method of claim 18, further comprising:

estimating noise for each path within the multi-path communication channel thereby generating the plurality of noise estimates corresponding to each path within the multi-path communication channel;

estimating cross-coupled noise between each of the paths within the multi-path communication channel thereby generating a plurality of cross-coupled noise estimates corresponding to cross-coupling between each of the paths within the multi-path communication channel;

generating the correlation matrix that includes the plurality of noise estimates corresponding to each path within the multi-path communication channel, wherein the correlation matrix also includes the plurality of cross-coupled noise estimates corresponding to cross-coupling between each of the paths within the multi-path communication channel.

20. The method of claim 18, wherein:

the processing the plurality of continuous time signals includes:

sampling the plurality of continuous time signals thereby generating a plurality of discrete time signals;

performing finite impulse response filtering and decimation to each of the plurality of discrete time signals thereby generating a plurality of FIR signals; and performing fast Fourier transform (FFT) processing that is operable to transform each of the plurality of FIR signals from the time domain to the frequency domain thereby generating the plurality of processed signals; and further comprising:

performing decoding and de-interleaving using the beam form soft decision.

* * * * *